Oct. 30, 1945.  S. G. ISSERSTEDT  2,387,795
AIRCRAFT CONTROL APPARATUS
Filed March 26, 1943
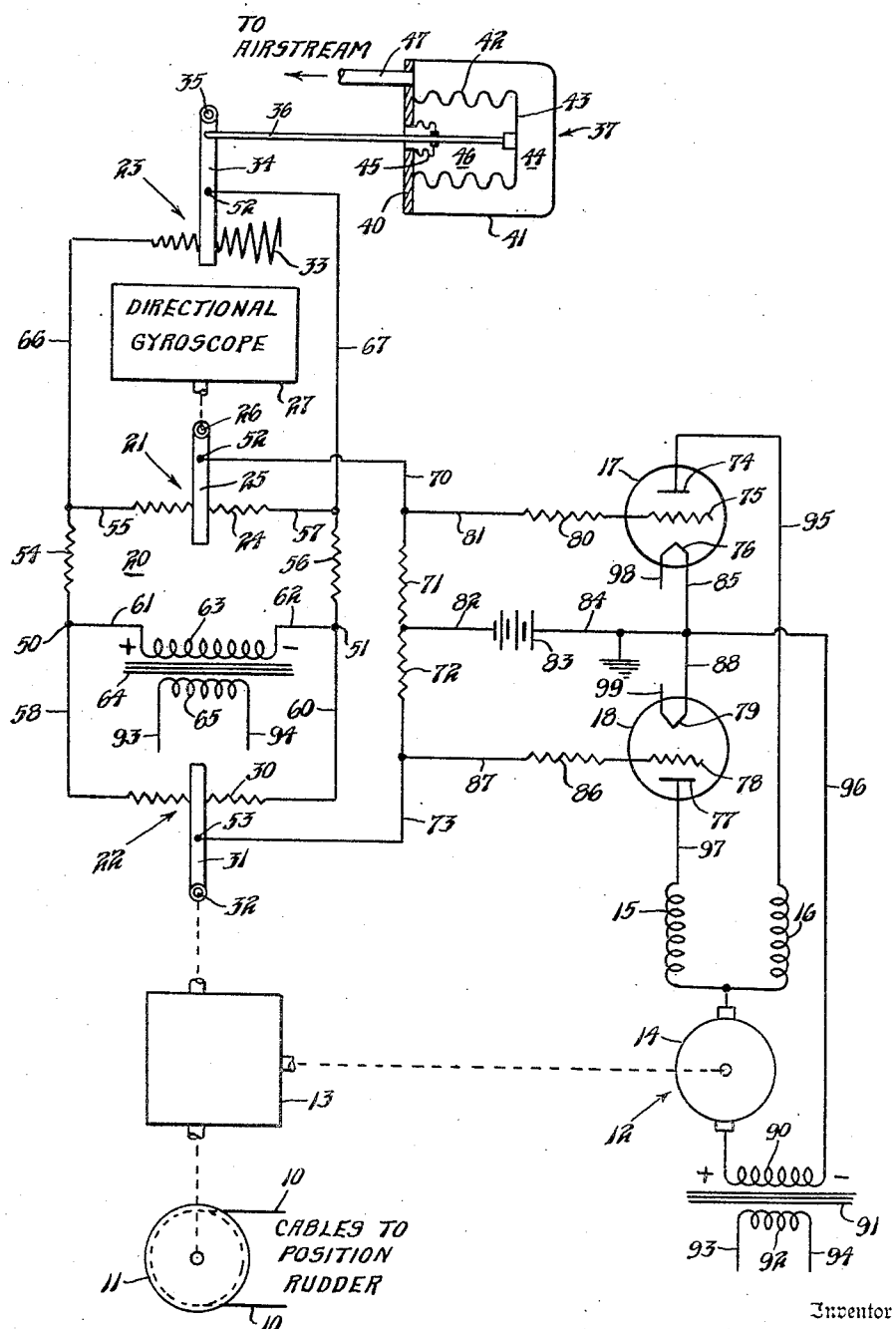
Inventor
SIEGFRIED G. ISSERSTEDT
By
George H. Fisher
Attorney Patented Oct. 30, 1945

2,387,795

UNITED STATES PATENT OFFICE 2,387,795

AIRCRAFT CONTROL APPARATUS

Siegfried G. Isserstedt, Toronto, Ontario, Canada, assignor to Minneapolis-Honeywell Regulator Company, Minneapolis, Minn., a corporation of Delaware Application March 26, 1943, Serial No. 480,674

7 Claims. (Cl. 172—282)

This present invention relates to control apparatus for aircraft, more particularly to control apparatus for automatically positioning a control surface, such as a rudder, aileron, or elevator.

It has previously been proposed to operate a control surface on an aircraft under the control of a sensitive device responsive to a condition which indicates the need for operation of the control surface. For example, it has been proposed to control the movements of the rudder of an aircraft in response to the deflections of a direction responsive device such as a directional gyroscope or a compass. The present invention is applicable to systems of that type.

When an aircraft control surface, such as a rudder, aileron, or elevator, is deflected from its normal position, it encounters air resistance which tends to move it laterally, back towards its normal position. If it is held in its deflected position by means of a cable or other device under the control of the pilot or under suitable automatic control, the force due to air resistance is transmitted to the aircraft itself, causing it to turn, if the control surface concerned is a rudder, to tilt if the control surface is an aileron, or to climb or dive if the control surface is an elevator.

It will be readily understood that the air resistance encountered by the control surface when deflected from its normal position, varies in accordance with the speed of the aircraft and in accordance with the density of the air through which the craft is moving. When the aircraft is moving at a high speed, the air resistance encountered by the control surface is much greater than when the aircraft is moving at a low speed. Similarly, when the aircraft is traveling fairly close to the ground, the air is more dense than at high altitudes, and the air resistance encountered by the control surface is correspondingly greater.

It has been found that the air resistance encountered by a control surface does not vary directly with the speed of the aircraft and the air density, but that it varies as a non-linear function of these conditions.

It is therefore an object of this invention to provide, in an automatic system for positioning a control surface on an aircraft, means for compensating the operation of the system in accordance with a non-linear function of the air speed and altitude of the aircraft.

Another object of the present invention is to provide an improved automatic control system for positioning a control surface on an aircraft, of the type wherein the control surface movement, under any given conditions, has a definite ratio with respect to the movements of the gyroscope or other sensitive controlling device.

A further object is to provide, in a system of the type described, means for varying the ratio between the control surface movement and the movement of the controlling device in accordance with the air speed and altitude of the aircraft. A still further object is to vary that ratio as a non-linear function of the altitude and air speed.

Other objects and advantages of the present invention will become apparent from a consideration of the attached specification, claims, and drawing, in which:

The single figure represents, somewhat diagrammatically, an automatic electrical rudder control system embodying my invention.

In the drawing is shown a system in which cables 10 are attached to an aircraft rudder (not shown) to control the position thereof. The cable 10 passes over a pulley 11 which is driven by a motor generally indicated as 12 through a gear train schematically shown at 13. The motor 12 comprises an armature 14 and a pair of field windings 15 and 16, which, when selectively energized, cooperate with the armature 14 to cause rotation thereof in opposite directions.

The selective energization of the field windings 15 and 16 is controlled by a pair of electrical discharge devices 17 and 18, which are in turn selectively rendered conductive in accordance with the sense of unbalance of an electrical bridge circuit generally indicated at 20. The bridge circuit 20 includes a control potentiometer 21, a rebalancing potentiometer 22, and a compensating rheostat 23.

The control potentiometer 21 comprises a slidewire resistance 24, and a slider 25 movable along the resistance 24. The slider 25 is mounted on a shaft 26, which is rotated by a directional gyroscope generally indicated at 27 in accordance with the deviation of the aircraft from a predetermined course.

The follow-up potentiometer 22 comprises a slidewire resistance 30 and a slider 31 movable along the resistance 30. The slider 31 is attached to a shaft 32, which is driven by the motor 12 through the gear train 13.

The compensating rheostat 23 comprises a tapered slidewire resistance 33, and a slider 34 movable along the resistance 33. The slider 34 is pivotally supported at 35, and is rotated about its pivot 35 in accordance with the translation of a connecting rod 36 by a pressure responsive control device generally indicated at 37.

The control device 37 comprises a base 40, which may be attached to any suitable support, and an outer casing 41 carried by the base 40. Inside the casing 41 and spaced substantially from the sides thereof is a flexible bellows 42. One end of the bellows 42 is attached, by any suitable means, to the base 40. The other end of the bellows 42 is closed by a suitable wall portion 43. The end of connecting rod 36 opposite the slider 34 is attached to the wall portion 43 by a suitable connection.

The space enclosed by the base 40, the casing 41, and the bellows 42 forms a chamber 44. The rod 36 passes through an aperture in the base 40 which is closed by a suitable sealing bellows 45. One end of the bellows 45 is suitably attached to the sides of the aperture in the base 40, and the other end is provided with a wall portion which is attached to the rod 36. All the joints between the bellows 42 and 45, base 40, and rod 36 may be made, for example, by soldering. The space enclosed by the bellows 42 and 45 and the base 40 forms a chamber 46. The chamber 46 may be evacuated, or it may be filled or partially filled with a fluid having such characteristics that a substantially constant pressure is maintained therein.

The chamber 44, on the other hand, is connected to a tube 47 whose opposite end is exposed to the air stream passing the aircraft in which the system is used. The pressure to which the outer end of tube 47 is exposed, and which is communicated to the chamber 44, is sometimes referred to as the dynamic pressure. This pressure includes two independently varying components, one of which is the atmospheric pressure, which changes with the altitude of the aircraft, and the other of which is the pressure due to the forward motion of the aircraft through the air. It should therefore be apparent that as the altitude decreases or the airspeed increases, the dynamic pressure increases, moving rod 36 and slider 34 to the left. Conversely, an increase in altitude or a decrease in airspeed causes movement of rod 36 and slider 34 to the right.

The bridge circuit 20 includes input terminals 50 and 51, and output terminals 52 and 53, which are interconnected by the conventional four arms of a Wheatstone bridge circuit. The upper left arm of bridge circuit 20, as it appears in the drawing, connects input terminal 50 with output terminal 52, and may be traced from input terminal 50 through a fixed resistance 54, a conductor 55, a portion of slidewire resistance 24, and slider 25 to output terminal 52. The upper right arm of bridge circuit 20 connects input terminal 51 with output terminal 52, and may be traced from input terminal 51 through a fixed resistance 56, a conductor 57, a portion of slidewire resistance 24, and slider 25 to output terminal 52. The lower left arm of bridge circuit 20 connects input terminal 50 with output terminal 53 and may be traced from input terminal 50 through a conductor 58, a portion of slidewire resistance 30, and slider 31 to output terminal 53. The lower right arm of bridge circuit 20 connects input terminal 51 with output terminal 53 and may be traced from input terminal 51 through a conductor 60, a portion of slidewire resistance 30, and slider 31 to output terminal 53.

While the output terminals 52 and 53 are shown as mounted on sliders 25 and 31, respectively, it should be understood that each output terminal is electrically and physically identical with its associated slider. The application of separate reference characters to the output terminals is merely for convenience in describing the operation of the system.

The input terminals 50 and 51 are connected by conductors 61 and 62, respectively, to a suitable power supply, such as the secondary winding 63 of the transformer 64, having a primary winding 65, which may be connected to any suitable source of alternating electrical energy, represented in the drawing by supply lines 93 and 94.

The left hand terminal of rheostat resistance 33 is connected to the left hand terminal of slidewire resistance 24 by means of a conductor 66, and the rheostat slider 34 is connected to the right hand terminal of slidewire resistance 24 by means of a conductor 67.

The output terminals 52 an 53 of bridge circuit 20 are connected by a bridge output circuit, which may be traced from output terminal 52 through a conductor 70, a resistance 71, a resistance 72, and a conductor 73 to output terminal 53.

The discharge device 17 is of the gas-filled type and is provided with an anode 74, a control electrode 75, and a cathode 76. The discharge device 18 is also of the gas-filled type, and is provided with an anode 77, a control electrode 78, and a cathode 79.

The discharge device 17 has an input circuit which may be traced from the control electrode 75 through a protective resistance 80, a conductor 81, resistance 71, a conductor 82, a biasing battery 83, and conductors 84 and 85 to cathode 76. The discharge device 18 has a corresponding input circuit which may be traced from control electrode 78, through a protective resistance 86, a conductor 87, resistance 72, conductor 82, biasing battery 83, and conductors 84 and 88 to cathode 79.

The discharge devices 17 and 18 have output circuits which are supplied with electrical energy from a secondary winding 90 of a transformer 91, having a primary winding 92, which may be connected to any suitable source of alternating electrical energy. This source should be of the same frequency and phase as that to which the transformer primary winding 65 is connected. This connection is indicated by the fact that both transformer primary windings are connected to supply lines 93 and 94.

The output circuit of discharge device 17 may be traced from the left hand terminal of secondary winding 90 through motor armature 14, field winding 16, a conductor 95, anode 74, cathode 76, and conductors 85 and 96 to the right hand terminal of secondary winding 90. The discharge device 18 is provided with a corresponding output circuit which may be traced from the left hand terminal of secondary winding 90 through motor armature 14, field winding 15, a conductor 97, anode 77, cathode 59, and conductors 88 and 96 to the right hand terminal of transformer winding 90.

The cathodes 76 and 79 may be supplied with electrical energy for heating purposes from any suitable source (not shown) through the conductors 85, 98, and 88, 99, respectively.

The gaseous discharge devices 17 and 18 have the characteristic, usual in such devices, that when a discharge therethrough is initiated, the discharge continues until the output circuit is externally interrupted. Although the control electrode of such a device may control the initiation of such a discharge, the control electrode has no further control over the conductivity of the device after the discharge has been initiated. Since the output circuits of the discharge devices 17 and 18 are energized with alternating electrical energy, these devices may be conductive only during those half cycles when the left end of secondary winding 90 (which is connected to anodes 74 and 77) is positive with respect to the right end (which is connected to cathodes 76 and 79). These half cycles will be hereinafter referred to as the positive half cycles. During the opposite, or negative half cycles, the electrical energy applied to the anodes and cathodes of the devices 17 and 18 is of a polarity such that any current flow therethrough is prevented. Hence a discharge initiated during any positive half cycle is stopped at the termination of that half cycle. In the present circuit, the biasing battery 83 is so chosen as to maintain the control electrodes 78 and 75 of the discharge devices 17 and 18 normally at a potential sufficiently negative with respect to their associated cathodes that no discharge is initiated in the discharge devices 17 and 18 during the positive half cycles. The devices 17 and 18 are therefore said to be biased to cut-off by the battery 83.

*Operation*

First consider the operation of the control system with the slider 34 stationary. After such operation has been described, the effect of movement of the slider 34 on the operation of the system will be further considered.

When the control potentiometer 21 and the follow-up potentiometer 22 are in the positions shown in the drawing, both the sliders 25 and 31 are at a potential corresponding to the median potential of the secondary winding 63. Since both the output terminals 52 and 53 are at the same potential, no current flows in the bridge output circuit connecting those terminals. There is therefore no potential drop across either of the resistances 71 and 72. As previously mentioned, the discharge devices 17 and 18 are biased to cut off the battery 83, and therefore both devices remain non-conductive. The motor 14 remains stationary, and the rudder remains in its normal or neutral position.

Let it now be considered that the aircraft in which this system is used deviates from its predetermined course in such a direction that the gyroscope 27 rotates the shaft 26 so as to move slider 25 to the left along resistance 24.

Considering the condition of the bridge circuit 20 when the slider 25 has been moved to the left from the position shown in the drawing, it will be seen that the slider 25 and hence the output terminal 52 has attained a position which is electrically closer to the left end of secondary winding 63 than to its right end, and hence, during the positive half cycles of the power supply, is positive with respect to output terminal 53. Therefore a current flows in the output circuit connecting terminals 52 and 53 in a direction from terminal 52 to terminal 53. This current, flowing through resistances 71 and 72, sets up a potential difference across each of these resistances of such a polarity that their upper terminals are positive with respect to their lower terminals. In the input circuit of the discharge device 18, this potential drop across resistance 72 is of the same polarity as that of battery 83, and the control electrode 78 is therefore made more negative, so that the discharge device 18 remains nonconductive. In the input circuit of the discharge device 17, however, this potential drop is of a polarity opposite to that of battery 83. This positive potential therefore partially counteracts the effect of biasing battery 83, and carries the control electrode 75 to a potential which is more positive than the cut-off potential of the device 17. A discharge is therefore initiated through the device 17, and is maintained throughout the half cycle during which anode 74 is positive with respect to cathode 76. During this discharge, current flows through the output circuit of discharge device 17, previously traced, thereby energizing armature 14 and field winding 16 of motor 12. Such energization of motor 12 causes its rotation in a direction so as to drive the rudder through gear train 13, pulley 11 and cables 10 to restore the aircraft to its predetermined course. At the time, the slider 31 of rebalancing potentiometer 22 is driven by the motor 12 through gear train 13 and shaft 32 so as to move toward the left end of resistance 30. As long as the bridge 20 remains unbalanced in the same sense, that is, so that the output terminal 52 is positive with respect to output terminal 53, the motor 12 is energized on each positive half cycle so as to drive the slider 31 further to the left and at the same time introduce a correcting deflection of the rudder. When the slider 31 has moved far enough to the left so that output terminal 53 is at the same potential as output terminal 52, the bridge circuit 20 is again balanced and the discharge device 17 remains non-conductive, the motor 12 being deenergized and the rudder remaining in its deflected position.

As the aircraft returns to its predetermined course in accordance with the corrective deflection of the rudder, the gyroscope 27 moves the slider 25 back toward its center position. This movement of slider 25 connects output terminal 52 to a point on resistance 24 which is more negative, during the positive half cycles of the power supply, than the point on resistance 30 to which output terminal 53 is connected. Current therefore flows in the output circuit connecting terminals 52 and 53 in a direction from terminal 53 to terminal 52. This current, flowing through resistances 72 and 71, sets up a potential difference across each of these resistances in such a direction that their lower terminals are positive with respect to their upper terminals. In the input circuit of the discharge device 17, this potential drop across resistance 71 is of the same polarity as the potential of the biasing battery 83, and the control electrode 75 is therefore made more negative, so that the discharge device 17 remains non-conductive. In the input circuit of the discharge device 18, however, the potential drop across resistance 72 is in the opposite sense to the potential of the biasing battery 83. The control electrode 78 is therefore supplied with a potential more positive than the negative value which maintains the device 18 cut off and a discharge is initiated through the device 18. This discharge persists throughout the positive half cycle, and while the discharge exists, a current flows through motor armature 14 and field winding 15. Energization of motor 12 in this manner causes it to drive the rudder in the opposite direction, back toward its normal position, and at the same time the slider 31 is driven to the right along resistance 30. This motion of the rudder and the slider 31 continues in the same direction as long as the bridge 20 is unbalanced in a sense which makes output terminal 53 positive with respect to output terminal 52. As soon as the aircraft has regained its predetermined course, and the rudder is returned to its normal or neutral position, bridge circuit 20 is again balanced and the motor 12 is stopped.

Since the rudder and the slider 31 of follow-up potentiometer 32 are mechanically connected, it will be readily understood that the movements of slider 31 are proportional to those of the rudder. From the foregoing description of the operation of the system, it should be also apparent that, for each movement of the slider 25 along resistance 24, the system produces a corresponding movement of slider 31 along resistance 30. When the slider 25 moves to a point along resistance 24, having a potential different from that of the point at which slider 31 engages resistance 30, the system causes a follow-up movement of slider 31 to a point having the same potential as that to which the slider 25 has been moved. It should therefore be apparent that the ratio between a given movement of slider 25 and the following movement of slider 31 is dependent on the ratio between the voltage drop per unit length along slider 24 and the voltage drop per unit length along resistance 30. Since the voltage gradient along the resistances 24 and 30 is substantially constant throughout their length, this ratio between the movement of the control slider 25 and the rebalancing slider 31 is constant throughout the range of such movement.

Now consider the effect of the compensating rheostat 23 on the system. The total potential supplied by the secondary winding 63 is divided, in the two upper arms of the bridge circuit 20, between voltage drops across the fixed resistances 54 and 56 and a voltage drop across the resistance 24. When the rheostat 23 is operated, the voltage drop across resistance 24 is changed. Since the total voltage drop remains the same, being fixed by the terminal voltage of secondary winding 63, the voltage drop across the fixed resistances 54 and 56 is also changed but in an opposite sense. If, for example, the slider 34 is moved to the left along rheostat resistance 33, the voltage drop across resistance 24 is reduced, since the total resistance between the terminals of resistance 24 is reduced. Therefore the voltage drop per unit length of resistance 24 is reduced, and a given movement of slider 25 causes a smaller change potential of output terminal 52, and hence produces a smaller following movement of slider 31. While a definite ratio still exists between the movements of slider 25 and the following movement of slider 31, the ratio has been increased by the movement of rheostat slider 34 to the left of the position shown in the drawing. In a similar manner, it will be understood that movement of the rheostat slider 34 to the right causes a decrease in the ratio between a given movement of slider 25 and the following movement of slider 31.

Since the rheostat resistance 33 is tapered, it will be seen that the change in resistance per unit movement of slider 34 increases as the slider moves from the left to the right end of its range of travel. Hence, the total resistance connected across the terminals of resistance 24 is a non-linear function of the position of slider 34. The position of slider 34 is controlled by the pressure responsive device 37 so that upon a change in altitude or air speed, such that the rudder will encounter greater air resistance, the pressure in the chamber 44 is increased. The pressure in chamber 46 is constant, and an increase in pressure in chamber 44 causes bellows 42 to collapse slightly, moving wall 43 to the left, and causing a corresponding leftward movement of rod 36 and slider 34. The ratio of the controlling movement of slider 25 to the following movement of slider 31, is thereby increased to reduce the deflection of the rudder in response to a given deflection of the gyroscope 27. This decrease in rudder deflection compensates for the increase in dynamic pressure, resulting in a substantially constant turning effect of the rudder in response to the gyroscope, at all conditions of altitude and airspeed.

On the other hand, if the altitude increases or the airspeed decreases, resulting in a decrease in the dynamic pressure, then the pressure in chamber 44 decreases. The pressure in chamber 46 being constant, the bellows 42 expands, moving rod 36 and slider 34 to the right. As explained above, this decreases the ratio between a given movement of slider 34 and the following movement of slider 31. In other words, the ratio between a given deflection of gyroscope 27 and the following movement of the rudder is decreased, so that a larger rudder deflection is obtained to compensate for the decreased air resistance resulting from the decreased dynamic pressure.

While I have shown and described a preferred embodiment of my invention, other modifications thereof will readily occur to those skilled in the art, and I therefore wish my invention to be limited only by the appended claims.

I claim as my invention:

1. A system for operating a control surface on an aircraft, comprising in combination, motor means for positioning said surface with respect to said aircraft, means movable in response to a condition indicative of the need for operation of said surface, a main controller driven by said condition responsive means, a follow-up controller driven by said motor means, means including said controllers for controlling said motor means to move said surface proportionally to the movements of said condition responsive means, means for varying the ratio between a given movement of said condition responsive means and the following movement of said surface, and means responsive to the speed of said aircraft relative to the surrounding air for operating said ratio varying means so that said ratio increases with increase in said speed, said ratio varying means including an element so formed that as said ratio varying means is operated by said speed responsive means to increase said ratio, the amount of change of said ratio for a unit change in said speed decreases with increase in speed.

2. A system for operating a control surface on an aircraft, comprising in combination, motor means for positioning said surface with respect to said aircraft, means movable in response to a condition indicative of the need for operation of said surface, a control potentiometer including an impedance element and a contact engageable with a plurality of points on said impedance element, a connection between said condition responsive means and said control potentiometer for causing relative movements of said impedance element and said contact corresponding to changes in said condition, a follow-up potentiometer including an impedance element and a contact engageable with a plurality of points thereon, a connection between said motor means and said follow-up potentiometer for causing relative movements of said impedance element and said contact corresponding to changes in the position of said control surface, means including said potentiometer for controlling said motor means to move said surface proportionally to the movements of said condition responsive means, means for varying the ratio between a given movement of said condition responsive means and the following movement of said surface comprising a variable impedance connected in parallel with one of said potentiometer impedance elements, and means responsive to a condition indicative of the air resistance encountered by said surface for operating said variable impedance.

3. A system for operating a control surface on an aircraft comprising in combination, motor means for positioning said surface with respect to said aircraft, means movable in response to a condition indicative of the need for operation of said surface, a control potentiometer including an impedance element and a contact engageable with a plurality of points on said impedance element, a connection between said condition responsive means and said control potentiometer for causing relative movements of said impedance element and said contact corresponding to changes in said condition, a follow-up potentiometer including an impedance element and a contact engageable with a plurality of points thereon, a connection between said motor means and said follow-up potentiometer for causing relative movements of said impedance element and said contact corresponding to changes in the position of said control surface, means including said potentiometers for controlling said motor means to move said surface proportionally to the movements of said condition responsive means, means for varying the ratio between a given movement of said condition responsive means and the following movement of said surface comprising a tapered resistance, a contact movable along said resistance, and connections between said contact and one end of said resistance, respectively, and the opposite ends of one of said potentiometer impedance elements, and means responsive to a condition indicative of the air resistance encountered by said surface for moving said movable contact along said tapered resistance in such a direction as to vary the potential drop across said one impedance upon an increase in said condition at a rate which decreases with an increase in the value of said condition.

4. Apparatus for controlling the position of a control surface on an aircraft comprising, in combination, motor means for positioning said surface with respect to said aircraft, means movable in response to a condition indicative of the need for operation of said surface, a control impedance including an impedance element and a member cooperating therewith for adjusting the impedance value of said impedance, a connection between said condition responsive means and said adjusting member for adjusting said impedance corresponding to changes in said condition, a follow-up impedance including an impedance element and a member associated therewith for adjusting said impedance, a connection between said motor means and the adjustable member of said follow-up impedance for causing adjustment of said follow-up impedance corresponding to changes in the position of said control surface, means including said control and follow-up impedances for controlling said motor means to move said surface proportionally to the movements of said condition responsive means, means for varying the ratio between a given movement of said condition responsive means and the following movement of said surface comprising a variable impedance connected in parallel with one of said previously named impedance elements, and means responsive to a condition indicative of the air resistance encountered by said surface for operating said variable impedance.

5. Apparatus for controlling the position of a control surface on an aircraft comprising, in combination, electrical motor means for positioning said surface with respect to said aircraft, means movable in response to a condition indicative of the need for operation of said surface, a control impedance including an impedance element and a member cooperating therewith for adjusting the impedance value of said impedance, a connection between said condition responsive means and said adjusting member for adjusting said impedance corresponding to changes in said condition, a follow-up impedance including an impedance element and a member associated therewith for adjusting said impedance, a connection between said motor means and the adjustable member of said follow-up impedance for causing adjustment of said follow-up impedance corresponding to changes in the position of said control surface, an electronic amplifier controlling the operation of said electrical motor means, a bridge including both said control and follow-up impedances, said bridge being connected to said amplifier for controlling said motor means to move said surface proportionally to the mvements of said condition responsive means, means for varying the ratio between a given movement of said condition responsive means and the following movement of said surface comprising a variable impedance connected in parallel with one of said previously named impedance elements, and means responsive to a condition indicative of the air resistance encountered by said surface for operating said variable impedance.

6. Apparatus for controlling the position of a control surface on an aircraft comprising, in combination, motor means for positioning said surface with respect to said aircraft, means movable in response to the attitude of the aircraft, a control impedance including an impedance element and a member cooperating therewith for adjusting the impedance value of said impedance, a connection between said attitude responsive means and said adjusting member for adjusting said impedance corresponding to changes in said condition, a follow-up impedance including an impedance element and a member associated therewith for adjusting said impedance, a connection between said motor means and the adjustable member of said follow-up impedance for causing adjustment of said follow-up impedance corresponding to changes in the position of said control surface, means including said control and follow-up impedances for controlling said motor means to move said surface proportionally to the movements of said condition responsive means, means for varying the ratio between a given movement of said condition responsive means and the following movement of said surface comprising a variable impedance connected in parallel with one of said previously named impedance elements, and means responsive to the dynamic air pressure adjacent to said aircraft for operating said variable impedance.

7. Apparatus for controlling the position of a control surface on an aircraft comprising, in combination, motor means for positioning said surface with respect to said aircraft, means movable in response to a condition indicative of the need for operation of said surface, a control impedance including an impedance element and a member cooperating therewith for adjusting the impedance value of said impedance, a connection between said condition responsive means and said adjusting member for adjusting said impedance corresponding to changes in said condition, a follow-up impedance including an impedance element and a member associated therewith for adjusting said impedance, a connection between said motor means and the adjustable member of said follow-up impedance for causing adjustment of said follow-up impedance corresponding to changes in the position of said control surface, means including said control and follow-up impedances for controlling said motor means to move said surface proportionally to the movements of said condition responsive means, means for varying the ratio between a given movement of said condition responsive means and the following movement of said surface comprising a variable impedance comprising an impedance element connected in parallel with said first named impedance element and a member cooperating therewith for adjusting the impedance value of said impedance, said member and impedance element being so related that the rate of increase of the impedance value of said impedance increases as said member is moved uniformly in one direction, and means responsive to a condition indicative of the air resistance encountered by said surface for moving said last named member in said one direction upon said condition decreasing.

S. ISSERSTEDT.